United States Patent
Wang (10) Patent No.: US 9,699,077 B2
(45) Date of Patent: Jul. 4, 2017

(54) METHOD FOR DETERMINING A PACKET FORWARDING PATH, NETWORK DEVICE, AND CONTROL DEVICE

(71) Applicant: Huawei Technologies Co., Ltd., Shenzhen, Guangdong (CN)

(72) Inventor: Jun Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 183 days.

(21) Appl. No.: 14/667,423

(22) Filed: Mar. 24, 2015

(65) Prior Publication Data

US 2015/0200842 A1 Jul. 16, 2015

Related U.S. Application Data

(63) Continuation of application No. PCT/CN2012/081933, filed on Sep. 25, 2012.

(51) Int. Cl.
*H04L 12/717* (2013.01)
*H04L 12/721* (2013.01)

(52) U.S. Cl.
CPC .......... *H04L 45/42* (2013.01); *H04L 45/127* (2013.01); *H04L 45/26* (2013.01)

(58) Field of Classification Search
None
See application file for complete search history.

(56) References Cited

U.S. PATENT DOCUMENTS

| 2007/0115989 | A1* | 5/2007 | Mirtorabi | H04L 45/02 370/392 |
| 2009/0003333 | A1 | 1/2009 | Davison et al. | |
| 2011/0261722 | A1* | 10/2011 | Awano | H04L 45/34 370/254 |
| 2014/0003232 | A1* | 1/2014 | Guichard | H04L 67/16 370/230 |

(Continued)

FOREIGN PATENT DOCUMENTS

| CN | 101039275 A | 9/2007 |
| CN | 101330448 A | 12/2008 |

(Continued)

OTHER PUBLICATIONS

J. Moy, "OSPF Version 2", Ascend Communications, Inc., Network Working Group, Apr. 1998, 246 pages.

*Primary Examiner* — Christopher Crutchfield
*Assistant Examiner* — Alan Lindenbaum (57) ABSTRACT

The application provides a method for determining a packet forwarding path, a network device acquires device information of the network device and interface information of the network device, so that the network device can send the device information of the network device and the interface information of the network device to a control device by using an IGP, so that the control device determines a packet forwarding path from the network device to the control device according to the device information of the network device and the interface information of the network device. Each network device that sends device information and interface information of the network device by using an IGP does not need to compute a packet forwarding path from the network device to a corresponding control device; therefore, decreasing a processing burden of the network device.

10 Claims, 3 Drawing Sheets

```
┌─────────────────────────────────────────────┐
│ A network device acquires device            │
│ information of the network device and       │──101
│ interface information of the network device │
└─────────────────────────────────────────────┘
                     │
                     ▼
┌─────────────────────────────────────────────┐
│ The network device sends the device         │
│ information of the network device and the   │
│ interface information of the network device │
│ to a control device by using an IGP, so     │──102
│ that the control device determines a packet │
│ forwarding path from the network device to  │
│ the control device according to the device  │
│ information of the network device and the   │
│ interface information of the network device │
└─────────────────────────────────────────────┘
```

(56) References Cited

U.S. PATENT DOCUMENTS

2014/0229581 A1 8/2014 Medved et al.

FOREIGN PATENT DOCUMENTS

| CN | 102498694 A | 6/2012 |
| CN | 102571557 A | 7/2012 |
| CN | 102664809 A | 9/2012 |
| CN | 103004147 A | 3/2013 |
| EP | 1 737 168 A1 | 12/2006 |
| JP | 2002374279 A | 12/2002 |

* cited by examiner

METHOD FOR DETERMINING A PACKET FORWARDING PATH, NETWORK DEVICE, AND CONTROL DEVICE

CROSS-REFERENCE TO RELATED APPLICATION

This application is a continuation of International Application No. PCT/CN2012/081933, filed on Sep. 25, 2012, which is hereby incorporated by reference in its entirety.

TECHNICAL FIELD

The present application relates to communications technologies, and in particular, to a method for determining a packet forwarding path, a network device, and a control device.

BACKGROUND

With the development of the Internet, a distributed system cannot better satisfy network scalability and a requirement for management, and therefore, a centralized system in which controlling and forwarding are separate, such as an OpenFlow system, emerges as required. A control device, such as a main control device (Master), and a network device managed by the control device, such as an access point (AP), jointly complete a packet forwarding process that is completely controlled by a switch/router originally, thereby implementing separation of data forwarding and routing control. As network devices increase, each network device needs to compute a packet forwarding path from the network device to a corresponding control device, and uses the Link Layer Discovery Protocol (LLDP) to send to the control device other information such as information related to the network device.

Each network device needs to compute a packet forwarding path from the network device to a corresponding control device, thereby causing an increase in a processing burden of the network device.

SUMMARY

Multiple aspects of the present application provide a method for determining a packet forwarding path, a network device, and a control device, to decrease a processing burden of a network device.

One aspect of the present application provides a method for determining a packet forwarding path, where the method is applied to a centralized system in which controlling and forwarding are separate, and the system includes a control device and a network device that is managed by the control device; and the method includes:

acquiring, by the network device, device information of the network device and interface information of the network device; and sending, by the network device, the device information of the network device and the interface information of the network device to the control device by using an Interior Gateway Protocol (IGP), so that the control device determines a packet forwarding path from the network device to the control device according to the device information of the network device and the interface information of the network device.

According to the foregoing aspect and any one possible implementation manner, an implementation manner is further provided, where the sending, by the network device, the device information of the network device and the interface information of the network device to the control device by using an IGP includes:

sending, by the network device, a link state protocol data unit or Link State Packet (LSP) to the control device, where the LSP carries the device information of the network device and the interface information of the network device; or sending, by the network device, an opaque link-state advertisement (LSA) to the control device, where the opaque LSA carries the device information of the network device and the interface information of the network device.

According to the foregoing aspect and any one possible implementation manner, an implementation manner is further provided, where the device information of the network device includes:

a device identifier of the network device;

a role identifier of the network device in the system; and a device identifier of the control device.

According to the foregoing aspect and any one possible implementation manner, an implementation manner is further provided, where the interface information of the network device includes:

an interface identifier of the network device;

an interface maximum transmission unit (MTU) of the network device;

an interface type of the network device; and a local circuit identifier of the network device, a circuit identifier of another network device adjacent to the network device, and a device identifier of the another network device.

According to the foregoing aspect and any one possible implementation manner, an implementation manner is further provided, where that the network device acquires the device identifier of the another network device adjacent to the network device includes:

receiving, by the network device, an Intermediate System to Intermediate System (ISIS) Hello packet, where the ISIS Hello packet carries the device identifier of the another network device adjacent to the network device; or receiving, by the network device, an Open Shortest Path First (OSPF) Hello packet, where the OSPF Hello packet carries the device identifier of the another network device adjacent to the network device.

Another aspect of the present application provides a method for determining a packet forwarding path, where the method is applied to a centralized system in which controlling and forwarding are separate, and the system includes a control device and a network device that is managed by the control device; and the method includes:

receiving, by the control device, device information of the network device and interface information of the network device that are sent by using an Interior Gateway Protocol (IGP) by the network device managed by the control device; and determining, by the control device, a packet forwarding path from the network device to the control device according to the device information of the network device and the interface information of the network device.

According to the foregoing aspect and any one possible implementation manner, an implementation manner is further provided, where the receiving, by the control device, device information of the network device and interface information of the network device that are sent by using an IGP by the network device managed by the control device includes:

receiving, by the control device, a link state protocol data unit or Link State Packet LSP sent by the network device, where the LSP carries the device information of the network device and the interface information of the network device; or receiving, by the control device, an opaque link-state advertisement LSA sent by the network device, where the opaque LSA carries the device information of the network device and the interface information of the network device.

According to the foregoing aspect and any one possible implementation manner, an implementation manner is further provided, where the device information of the network device includes:

a device identifier of the network device;
a role identifier of the network device in the system; and
a device identifier of the control device.

According to the foregoing aspect and any one possible implementation manner, an implementation manner is further provided, where the interface information of the network device includes:

an interface identifier of the network device;
an interface maximum transmission unit (MTU) of the network device;
an interface type of the network device; and
a local circuit identifier of the network device, a circuit identifier of another network device adjacent to the network device, and a device identifier of the another network device.

Another aspect of the present application provides a network device, where the network device is applied to a centralized system in which controlling and forwarding are separate, and the system includes a control device and the network device that is managed by the control device; and the network device includes:

an acquiring unit, configured to acquire device information of the network device and interface information of the network device, and transmit the device information of the network device and the interface information of the network device to a sending unit; and the sending unit, configured to send the device information of the network device and the interface information of the network device to the control device by using an Interior Gateway Protocol IGP, so that the control device determines a packet forwarding path from the network device to the control device according to the device information of the network device and the interface information of the network device.

According to the foregoing aspect and any one possible implementation manner, an implementation manner is further provided, where the sending unit is specifically configured to:

send a link state protocol data unit or Link State Packet LSP to the control device, where the LSP carries the device information of the network device and the interface information of the network device; or send an opaque link-state advertisement (LSA) to the control device, where the opaque LSA carries the device information of the network device and the interface information of the network device.

According to the foregoing aspect and any one possible implementation manner, an implementation manner is further provided, where the device information of the network device acquired by the acquiring unit includes:

a device identifier of the network device;
a role identifier of the network device in the system; and
a device identifier of the control device.

According to the foregoing aspect and any one possible implementation manner, an implementation manner is further provided, where the interface information of the network device acquired by the acquiring unit includes:

an interface identifier of the network device;
an interface maximum transmission unit (MTU) of the network device;
an interface type of the network device; and
a local circuit identifier of the network device, a circuit identifier of another network device adjacent to the network device, and a device identifier of the another network device.

According to the foregoing aspect and any one possible implementation manner, an implementation manner is further provided, where the acquiring unit is specifically configured to:

receive an Intermediate System to Intermediate System (ISIS) Hello packet, where the ISIS Hello packet carries the device identifier of the another network device adjacent to the network device; or receive an Open Shortest Path First (OSPF) Hello packet, where the OSPF Hello packet carries the device identifier of the another network device adjacent to the network device.

Another aspect of the present application provides a control device, where the control device is applied to a centralized system in which controlling and forwarding are separate, and the system includes the control device and a network device that is managed by the control device; and the control device includes:

a receiving unit, configured to receive device information of the network device and interface information of the network device that are sent by using an Interior Gateway Protocol (IGP) by the network device managed by the control device, and transmit the device information of the network device and the interface information of the network device to a determining unit; and the determining unit, configured to determine a packet forwarding path from the network device to the control device according to the device information of the network device and the interface information of the network device.

According to the foregoing aspect and any one possible implementation manner, an implementation manner is further provided, where the receiving unit is specifically configured to:

receive a link state protocol data unit or Link State Packet LSP sent by the network device, where the LSP carries the device information of the network device and the interface information of the network device; or receive an opaque link-state advertisement (LSA) sent by the network device, where the opaque LSA carries the device information of the network device and the interface information of the network device.

According to the foregoing aspect and any one possible implementation manner, an implementation manner is further provided, where the device information of the network device received by the receiving unit includes:

a device identifier of the network device;
a role identifier of the network device in the system; and
a device identifier of the control device.

According to the foregoing aspect and any one possible implementation manner, an implementation manner is further provided, where the interface information of the network device received by the receiving unit includes:

an interface identifier of the network device;
an interface maximum transmission unit (MTU) of the network device;
an interface type of the network device; and
a local circuit identifier of the network device, a circuit identifier of another network device adjacent to the network device, and a device identifier of the another network device.

Another aspect of the present application provides a network device, where the network device is applied to a centralized system in which controlling and forwarding are separate, and the system includes a control device and the network device that is managed by the control device; and the network device includes:

a processor, configured to acquire device information of the network device and interface information of the network device, and transmit the device information of the network device and the interface information of the network device to a sender; and the sender, configured to send the device information of the network device and the interface information of the network device to the control device by using an IGP, so that the control device determines a packet forwarding path from the network device to the control device according to the device information of the network device and the interface information of the network device.

According to the foregoing aspect and any one possible implementation manner, an implementation manner is further provided, where the sender is specifically configured to:

send a link state protocol data unit or Link State Packet (LSP) to the control device, where the LSP carries the device information of the network device and the interface information of the network device; or send an opaque link-state advertisement (LSA) to the control device, where the opaque LSA carries the device information of the network device and the interface information of the network device.

According to the foregoing aspect and any one possible implementation manner, an implementation manner is further provided, where the device information of the network device acquired by the processor includes:

a device identifier of the network device;

a role identifier of the network device in the system; and a device identifier of the control device.

According to the foregoing aspect and any one possible implementation manner, an implementation manner is further provided, where the interface information of the network device acquired by the processor includes:

an interface identifier of the network device;

an interface maximum transmission unit (MTU) of the network device;

an interface type of the network device; and a local circuit identifier of the network device, a circuit identifier of another network device adjacent to the network device, and a device identifier of the another network device.

According to the foregoing aspect and any one possible implementation manner, an implementation manner is further provided, where the processor is specifically configured to:

receive an Intermediate System to Intermediate System (ISIS) Hello packet, where the ISIS Hello packet carries the device identifier of the another network device adjacent to the network device; or receive an Open Shortest Path First (OSPF) Hello packet, where the OSPF Hello packet carries the device identifier of the another network device adjacent to the network device.

Another aspect of the present application provides a control device, where the control device is applied to a centralized system in which controlling and forwarding are separate, and the system includes the control device and a network device that is managed by the control device; and the control device includes:

a receiver, configured to receive device information of the network device and interface information of the network device that are sent by using an Interior Gateway Protocol IGP by the network device managed by the control device, and transmit the device information of the network device and the interface information of the network device to a processor; and the processor, configured to determine a packet forwarding path from the network device to the control device according to the device information of the network device and the interface information of the network device.

According to the foregoing aspect and any one possible implementation manner, an implementation manner is further provided, where the receiver is specifically configured to:

receive a link state protocol data unit or Link State Packet (LSP) sent by the network device, where the LSP carries the device information of the network device and the interface information of the network device; or receive an opaque link-state advertisement (LSA) sent by the network device, where the opaque LSA carries the device information of the network device and the interface information of the network device.

According to the foregoing aspect and any one possible implementation manner, an implementation manner is further provided, where the device information of the network device received by the receiver includes:

a device identifier of the network device;

a role identifier of the network device in the system; and a device identifier of the control device.

According to the foregoing aspect and any one possible implementation manner, an implementation manner is further provided, where the interface information of the network device received by the receiver includes:

an interface identifier of the network device;

an interface maximum transmission unit (MTU) of the network device;

an interface type of the network device; and a local circuit identifier of the network device, a circuit identifier of another network device adjacent to the network device, and a device identifier of the another network device.

As can be known from the foregoing technical solution, in the embodiments of the present application, a network device acquires device information of the network device and interface information of the network device, so that the network device can send the device information of the network device and the interface information of the network device to a control device by using an IGP, so that the control device determines a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

BRIEF DESCRIPTION OF THE DRAWINGS

To describe the technical solutions in the embodiments of the present application more clearly, the following briefly introduces the accompanying drawings required for describing the embodiments. Apparently, the accompanying drawings in the following description show some embodiments of the present application, and a person of ordinary skill in the art may still derive other drawings from these accompanying drawings without creative efforts.

DETAILED DESCRIPTION

To make the objectives, technical solutions, and advantages of the embodiments of the present application clearer, the following clearly describes the technical solutions in the embodiments of the present application with reference to the accompanying drawings in the embodiments of the present application. Apparently, the described embodiments are merely a part rather than all of the embodiments of the present application. All other embodiments obtained by a person of ordinary skill in the art based on the embodiments of the present application without creative efforts shall fall within the protection scope of the present application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that the technical solutions of the present application can be applied to a centralized system in which controlling and forwarding are separate, for example, an OpenFlow system.

Figure 1:
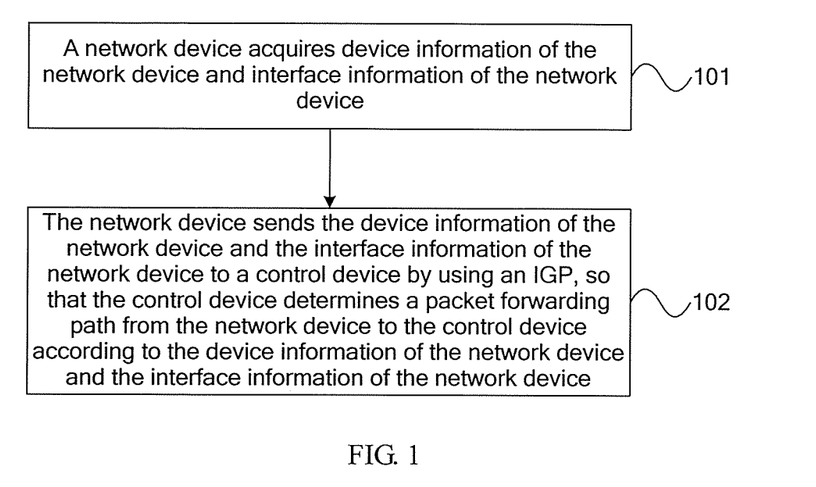
FIG. 1 is a schematic flowchart of a method for determining a packet forwarding path according to an embodiment of the present application.

FIG. 1 is a schematic flowchart of a method for determining a packet forwarding path according to an embodiment of the present application. The method is applied to a centralized system in which controlling and forwarding are separate, where the system includes a control device and a network device that is managed by the control device, as shown in FIG. 1.

101. The network device acquires device information of the network device and interface information of the network device.

102. The network device sends the device information of the network device and the interface information of the network device to the control device by using an Interior Gateway Protocol (IGP), so that the control device determines a packet forwarding path from the network device to the control device according to the device information of the network device and the interface information of the network device.

The IGP may include the Intermediate System to Intermediate System (ISIS) protocol, the Open Shortest Path First (OSPF) protocol, the Routing Information Protocol (RIP), or the like.

Specifically, the network device spreads the device information of the network device and the interface information of the network device to the control device by using an IGP flooding mechanism; and the network device does not need to compute a packet forwarding path from the network device to the corresponding control device.

A network device and a control device corresponding to the network device are used only as an example for description herein. It can be understood that there may be another control device and a network device that is managed by the control device, which is not limited herein.

The packet forwarding path may include but is not limited to a label switched path (LSP) in a traffic engineering (Traffic Engineering, TE) tunnel established based on the Resource Reservation Protocol (RSVP), an LSP established based on the Label Distribution Protocol (LDP), or a pseudo wire (PW).

For example, the network device, which is an entity for executing steps 101 and 102, may be an OpenFlow switch in an OpenFlow system; and the control device may be a control server (Controller) in the OpenFlow system.

Optionally, in a possible implementation manner of this embodiment, the device information of the network device may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device may include but is not limited to:

an interface identifier of the network device;

an interface maximum transmission unit (MTU) of the network device;

an interface type of the network device, for example, peer-to-peer (Peer-to-Peer, P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of the another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

To make the method provided in this embodiment of the present application clearer, the following uses the ISIS protocol and the OSPF protocol as examples to describe in detail how the network device acquires the device identifier of the another network device adjacent to the network device.

For the ISIS protocol, the network device may specifically receive an ISIS Hello (IIH) packet, where the ISIS Hello packet carries the device identifier of the another network device adjacent to the network device.

For the OSPF protocol, the network device may specifically receive an OSPF Hello packet, where the OSPF Hello packet carries the device identifier of the another network device adjacent to the network device.

To make the method provided in this embodiment of the present application clearer, the following uses the ISIS protocol and the OSPF protocol as examples to describe in detail how the network device executes step 102.

For the ISIS protocol, the network device may specifically use a link state protocol data unit or Link State Packet (LSP) to carry the device information of the network device and the interface information of the network device, and send the LSP to the control device. For example, the device information of the network device and the interface information of the network device are carried in the LSP in a manner of extending a type-length-value (TLV).

For the OSPF protocol, the network device may specifically carry the device information of the network device and the interface information of the network device in an opaque link-state advertisement (LSA), and send the LSA to the control device. For example, the device information of the network device and the interface information of the network device are carried in the opaque LSA in a manner of extending a type-length-value (TLV).

It can be understood that, in this embodiment, a packet forwarding path from the control device to the network device can still be determined according to a method provided in the prior art, which is not described herein again.

In this embodiment, a network device acquires device information of the network device and interface information of the network device, so that the network device can send the device information of the network device and the interface information of the network device to a control device by using an IGP, so that the control device determines a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

Figure 2:
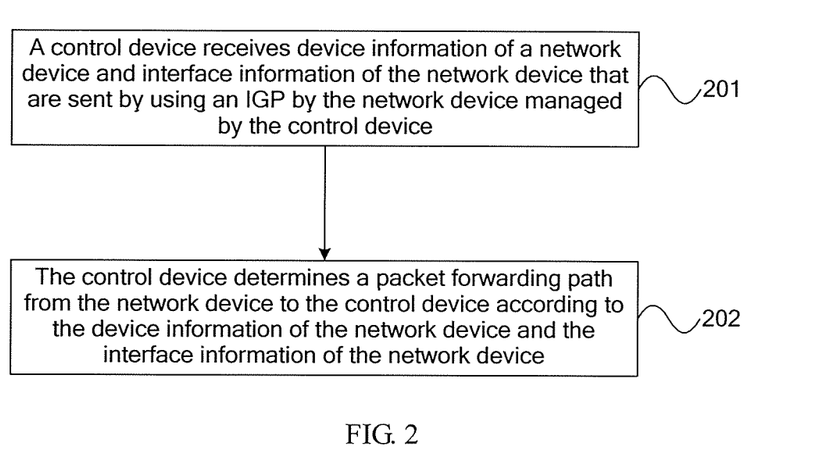
FIG. 2 is a schematic flowchart of a method for determining a packet forwarding path according to another embodiment of the present application.

FIG. 2 is a schematic flowchart of a method for determining a packet forwarding path according to another embodiment of the present application. The method is applied to a centralized system in which controlling and forwarding are separate, where the system includes a control device and a network device that is managed by the control device, as shown in FIG. 2.

201. The control device receives device information of the network device and interface information of the network device that are sent by using an IGP by the network device managed by the control device.

Specifically, the network device spreads the device information of the network device and the interface information of the network device to the control device by using an IGP flooding mechanism; and the network device does not need to compute a packet forwarding path from the network device to the corresponding control device.

202. The control device determines a packet forwarding path from the network device to the control device according to the device information of the network device and the interface information of the network device.

The IGP may include the Intermediate System to Intermediate System (ISIS) protocol, the Open Shortest Path First (Open Shortest Path First, OSPF) protocol, the Routing Information Protocol (RIP), or the like.

A control device and a network device that is managed by the control device are used only as an example for description herein. It can be understood that there may be another network device managed by the control device, and another control device and a network device that is managed by the control device, which is not limited herein.

The packet forwarding path may include but is not limited to a label switched path (LSP) in a traffic engineering (TE) tunnel established based on the Resource Reservation Protocol (RSVP), an LSP established based on the Label Distribution Protocol (LDP), or a pseudo wire (PW).

For example, the control device, which is an entity for executing steps 201 and 202, may be a control server (Controller) in an OpenFlow system; and the network device managed by the control device may be an OpenFlow switch in the OpenFlow system.

Optionally, in a possible implementation manner of this embodiment, the device information of the network device may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device may include but is not limited to:

an interface identifier of the network device;

an interface maximum transmission unit (Maximum Transmission Unit, MTU) of the network device;

an interface type of the network device, for example, peer-to-peer (Peer-to-Peer, P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of the another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

To make the method provided in this embodiment of the present application clearer, the following uses the ISIS protocol and the OSPF protocol as examples to describe in detail how the network device acquires the device identifier of the another network device adjacent to the network device.

For the ISIS protocol, the network device may specifically receive an ISIS Hello (IIH) packet, where the ISIS Hello packet carries the device identifier of the another network device adjacent to the network device.

For the OSPF protocol, the network device may specifically receive an OSPF Hello packet, where the OSPF Hello packet carries the device identifier of the another network device adjacent to the network device.

To make the method provided in this embodiment of the present application clearer, the following uses the ISIS protocol and the OSPF protocol as examples to describe in detail how the control device executes step 201.

For the ISIS protocol, the network device may specifically carry the device information of the network device and the interface information of the network device in a link state protocol data unit or Link State Packet (LSP), and send the LSP to the control device. For example, the device information of the network device and the interface information of the network device are carried in the LSP in a manner of extending a type-length-value (TLV).

For the OSPF protocol, the network device may specifically carry the device information of the network device and the interface information of the network device in an opaque (Opaque) link-state advertisement (LSA), and send the LSA to the control device. For example, the device information of the network device and the interface information of the network device are carried in the opaque LSA in a manner of extending a type-length-value (TLV).

It can be understood that, in this embodiment, a packet forwarding path from the control device to the network device can still be determined according to a method provided in the prior art, which is not described herein again.

In this embodiment, a control device receives device information of a network device and interface information of the network device that are sent by using an IGP by the network device managed by the control device, so that the control device can determine a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

It should be noted that, for ease of description in the method embodiments above, the method is described as a series of actions. Those skilled in the art are aware that the actions are not limited by the sequence described herein and may occur in other sequences or occur simultaneously. In addition, those skilled in the art should understand that the embodiments described in the specification are exemplary embodiments and that actions and modules involved in these embodiments are not necessarily required for this application.

In the foregoing embodiments, the description of each embodiment has its focus. For a part that is not described in detail in an embodiment, reference may be made to related descriptions in other embodiments.

Figure 3:
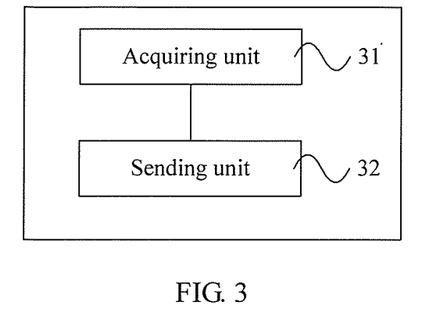
FIG. 3 is a schematic structural diagram of a network device according to another embodiment of the present application.

FIG. 3 is a schematic structural diagram of a network device according to another embodiment of the present application. The network device in this embodiment can be applied to a centralized system in which controlling and forwarding are separate, where the system includes a control device and the network device that is managed by the control device. As shown in FIG. 3, the network device may include an acquiring unit 31 and a sending unit 32. The acquiring unit 31 is configured to acquire device information of the network device and interface information of the network device, and transmit the device information of the network device and the interface information of the network device to the sending unit 32; and the sending unit 32 is configured to send the device information of the network device and the interface information of the network device to the control device by using an IGP, so that the control device determines a packet forwarding path from the network device to the control device according to the device information of the network device and the interface information of the network device.

The IGP may include the Intermediate System to Intermediate System (ISIS) protocol, the Open Shortest Path First (OSPF) protocol, the Routing Information Protocol (RIP), or the like.

The packet forwarding path may include but is not limited to a label switched path (LSP) in a traffic engineering (TE) tunnel established based on the Resource Reservation Protocol (RSVP), an LSP established based on the Label Distribution Protocol (LDP), or a pseudo wire (PW).

It should be noted that the network device provided in this embodiment may be an OpenFlow switch in an OpenFlow system; and the control device may be a control server (Controller) in the OpenFlow system.

Optionally, in a possible implementation manner of this embodiment, the device information of the network device acquired by the acquiring unit 31 may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device acquired by the acquiring unit 31 may include but is not limited to:

an interface identifier of the network device;

an interface maximum transmission unit (Maximum Transmission Unit, MTU) of the network device;

an interface type of the network device, for example, peer-to-peer (Peer-to-Peer, P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of the another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

For example, the acquiring unit 31 may be specifically configured to receive an ISIS Hello packet, where the ISIS Hello packet carries the device identifier of the another network device adjacent to the network device.

For another example, the acquiring unit 31 may be specifically configured to receive an OSPF Hello packet, where the OSPF Hello packet carries the device identifier of the another network device adjacent to the network device.

The IGP may include the Intermediate System to Intermediate System (ISIS) protocol, the Open Shortest Path First (OSPF) protocol, the Routing Information Protocol (RIP), or the like.

For example, the sending unit 32 may be specifically configured to send an LSP to the control device, where the LSP carries the device information of the network device and the interface information of the network device.

For another example, the sending unit 32 may be specifically configured to send an opaque LSA to the control device, where the opaque LSA carries the device information of the network device and the interface information of the network device.

In this embodiment, a network device acquires device information of the network device and interface information of the network device by using an acquiring unit, so that a sending unit can send the device information of the network device and the interface information of the network device to a control device by using an IGP, so that the control device determines a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

Figure 4:
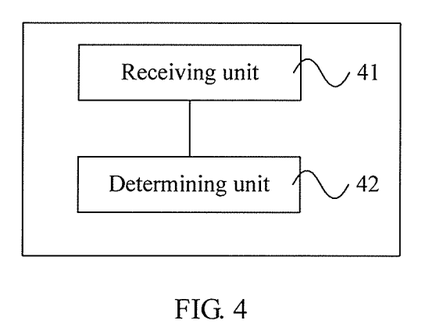
FIG. 4 is a schematic structural diagram of a control device according to another embodiment of the present application.

FIG. 4 is a schematic structural diagram of a control device according to another embodiment of the present application. The control device in this embodiment can be applied to a centralized system in which controlling and forwarding are separate, where the system includes the control device and a network device that is managed by the control device. As shown in FIG. 4, the control device may include a receiving unit 41 and a determining unit 42. The receiving unit 41 is configured to receive device information of the network device and interface information of the network device that are sent by using an IGP by the network device managed by the control device, and transmit the device information of the network device and the interface information of the network device to the determining unit 42; and the determining unit 42 is configured to determine a packet forwarding path from the network device to the control device according to the device information of the network device and the interface information of the network device.

The IGP may include the Intermediate System to Intermediate System (ISIS) protocol, the Open Shortest Path First (OSPF) protocol, the Routing Information Protocol (RIP), or the like.

The packet forwarding path may include but is not limited to a label switched path (LSP) in a traffic engineering (TE) tunnel established based on the Resource Reservation Protocol (RSVP), an LSP established based on the Label Distribution Protocol (LDP), or a pseudo wire (PW).

It should be noted that the control device provided in this embodiment may be a control server (Controller) in an OpenFlow system; and the network device managed by the control device may be an OpenFlow switch in the OpenFlow system.

Optionally, in a possible implementation manner of this embodiment, the device information of the network device received by the receiving unit 41 may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device received by the receiving unit 41 may include but is not limited to:

an interface identifier of the network device;

an interface maximum transmission unit (MTU) of the network device;

an interface type of the network device, for example, peer-to-peer (P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

The IGP may include the Intermediate System to Intermediate System (ISIS) protocol, the Open Shortest Path First (OSPF) protocol, the Routing Information Protocol (RIP), or the like.

For example, the receiving unit 41 may be specifically configured to receive an LSP sent by the network device, where the LSP carries the device information of the network device and the interface information of the network device.

For another example, the receiving unit 41 may be specifically configured to receive an opaque LSA sent by the network device, where the opaque LSA carries the device information of the network device and the interface information of the network device.

In this embodiment, a control device receives, by using a receiving unit, device information of a network device and interface information of the network device that are sent by using an IGP by the network device managed by the control device, so that a determining unit can determine a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

Figure 5:
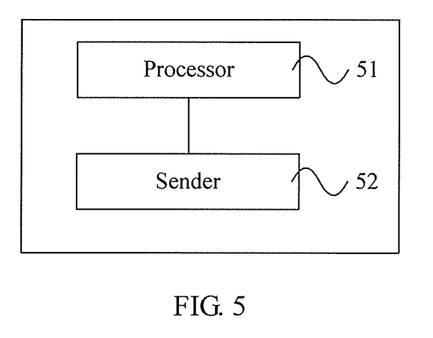
FIG. 5 is a schematic structural diagram of a network device according to another embodiment of the present application.

FIG. 5 is a schematic structural diagram of a network device according to another embodiment of the present application. The network device in this embodiment can be applied to a centralized system in which controlling and forwarding are separate, where the system includes a control device and the network device that is managed by the control device. As shown in FIG. 5, the network device may include a processor 51 and a sender 52. The processor 51 is configured to acquire device information of the network device and interface information of the network device, and transmit the device information of the network device and the interface information of the network device to the sender 52; and the sender 52 is configured to send the device information of the network device and the interface information of the network device to the control device by using an IGP, so that the control device determines a packet forwarding path from the network device to the control device according to the device information of the network device and the interface information of the network device.

The IGP may include the Intermediate System to Intermediate System (ISIS) protocol, the Open Shortest Path First (OSPF) protocol, the Routing Information Protocol (RIP), or the like.

The packet forwarding path may include but is not limited to a label switched path (LSP) in a traffic engineering (TE) tunnel established based on the Resource Reservation Protocol (RSVP), an LSP established based on the Label Distribution Protocol (LDP), or a pseudo wire (PW).

It should be noted that the network device provided in this embodiment may be an OpenFlow switch in an OpenFlow system; and the control device may be a control server (Controller) in the OpenFlow system.

Optionally, in a possible implementation manner of this embodiment, the device information of the network device acquired by the processor 51 may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device acquired by the processor 51 may include but is not limited to:

an interface identifier of the network device;

an interface maximum transmission unit (MTU) of the network device;

an interface type of the network device, for example, peer-to-peer (Peer-to-Peer, P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

For example, the processor 51 may be specifically configured to receive an ISIS Hello packet, where the ISIS Hello packet carries the device identifier of another network device adjacent to the network device.

For another example, the processor 51 may be specifically configured to receive an OSPF Hello packet, where the OSPF Hello packet carries the device identifier of another network device adjacent to the network device.

The IGP may include the Intermediate System to Intermediate System (ISIS) protocol, the Open Shortest Path First (OSPF) protocol, the Routing Information Protocol (RIP), or the like.

For example, the sender 52 may be specifically configured to send an LSP to the control device, where the LSP carries the device information of the network device and the interface information of the network device.

For another example, the sender 52 may be specifically configured to send an opaque LSA to the control device, where the opaque LSA carries the device information of the network device and the interface information of the network device.

In this embodiment, a network device acquires device information of the network device and interface information of the network device by using a processor, so that a sender can send the device information of the network device and the interface information of the network device to a control device by using an IGP, so that the control device determines a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

Figure 6:
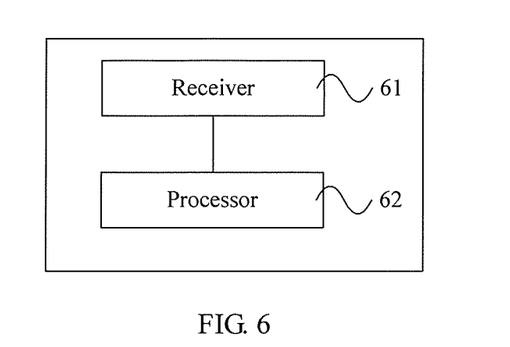
FIG. 6 is a schematic structural diagram of a control device according to another embodiment of the present application.

FIG. 6 is a schematic structural diagram of a control device according to another embodiment of the present application. The control device in this embodiment can be applied to a centralized system in which controlling and forwarding are separate, where the system includes the control device and a network device that is managed by the control device. As shown in FIG. 6, the control device may include a receiver 61 and a processor 62. The receiver 61 is configured to receive device information of the network device and interface information of the network device that are sent by using an IGP by the network device managed by the control device, and transmit the device information of the network device and the interface information of the network device to the processor 62; and the processor 62 is configured to determine a packet forwarding path from the network device to the control device according to the device information of the network device and the interface information of the network device.

The IGP may include the Intermediate System to Intermediate System (ISIS) protocol, the Open Shortest Path First (OSPF) protocol, the Routing Information Protocol (RIP), or the like.

The packet forwarding path may include but is not limited to a label switched path (LSP) in a traffic engineering (TE) tunnel established based on the Resource Reservation Protocol (RSVP), an LSP established based on the Label Distribution Protocol (LDP), or a pseudo wire (PW).

It should be noted that the control device provided in this embodiment may be a control server (Controller) in an OpenFlow system; and the network device managed by the control device may be an OpenFlow switch in the OpenFlow system.

Optionally, in a possible implementation manner of this embodiment, the device information of the network device received by the receiver 61 may include but is not limited to:

a device identifier of the network device, for example, a management IP address;

a role identifier of the network device in the system; and a device identifier of the control device.

The role identifier may be used to indicate a role of a device in the system, for example, a role identifier indicating a controlling role, and for another example, a role identifier indicating a forwarding role. The role identifier of the network device in the system can be understood as the role identifier indicating a forwarding role.

Optionally, in a possible implementation manner of this embodiment, the interface information of the network device received by the receiver 61 may include but is not limited to:

an interface identifier of the network device;

an interface maximum transmission unit (MTU) of the network device;

an interface type of the network device, for example, peer-to-peer (Peer-to-Peer, P2P) or a broadcasting network; and a local circuit identifier (Circuit ID) of the network device, a circuit identifier of another network device adjacent to the network device, and a device identifier of the another network device.

The interface type of the network device, the local circuit identifier of the network device, the circuit identifier of another network device adjacent to the network device, and the device identifier of the another network device jointly identify a pair of neighbor relationships. Interfaces with different interface types may be allocated a same circuit identifier, or may be allocated different circuit identifiers, which is not limited by this embodiment.

The IGP may include the Intermediate System to Intermediate System (ISIS) protocol, the Open Shortest Path First (OSPF) protocol, the Routing Information Protocol (RIP), or the like.

For example, the receiver 61 may be specifically configured to receive an LSP sent by the network device, where the LSP carries the device information of the network device and the interface information of the network device.

For another example, the receiver 61 may be specifically configured to receive an opaque LSA sent by the network device, where the opaque LSA carries the device information of the network device and the interface information of the network device.

In this embodiment, a control device receives, by using a receiver, device information of a network device and interface information of the network device that are sent by using an IGP by the network device managed by the control device, so that a processor can determine a packet forwarding path from the network device to the control device according to the device information of the network device and the interface information of the network device. Each network device that sends device information of the network device and interface information of the network device by using an IGP does not need to compute a packet forwarding path from the network device to a corresponding control device; therefore, a processing burden of the network device can be decreased.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for determining a packet forwarding path, wherein the method is applied to a centralized system in which controlling and forwarding are separate, and the system comprises a control device and a network device managed by the control device, the method comprising:

acquiring, by the network device, device information of the network device and interface information of the network device, wherein the device information of the network device comprises:

a device identifier of the network device, a device identifier of the control device, and a role identifier of the network device indicating a forwarding role in the centralized system, wherein the interface information of the network device comprises:

an interface identifier of the network device, an interface maximum transmission unit (MTU) of the network device, an interface type of the network device, a local circuit identifier of the network device, a circuit identifier of another network device adjacent to the network device, and a device identifier of the another network device, wherein the interface type of the network device, the local circuit identifier of the network device, the circuit identifier of the another network device and the device identifier of the another network device jointly identify a pair of neighbor relationships between the network device and the another network device; and sending, by the network device, the device information and the interface information to the control device using an Interior Gateway Protocol (IGP) while not computing a packet forwarding path from the network device to the control device, so that the control device determines a packet forwarding path from the network device to the control device based on the device information and the interface information.

2. The method according to claim 1, wherein sending, by the network device, the device information and the interface information to the control device by using an IGP comprises:
sending, by the network device, a link state protocol data unit or Link State Packet (LSP) to the control device, wherein a Type Length Value (TLV) of the LSP carries the device information and the interface information; or
sending, by the network device, an opaque link-state advertisement LSA to the control device, wherein a TLV of the opaque LSA carries the device information and the interface information.

3. The method according to claim 1, wherein acquiring the device identifier of the other network device adjacent to the network device comprises:
receiving, by the network device, an Intermediate System to Intermediate System (ISIS) Hello packet carrying the device identifier of the other network device adjacent to the network device; or
receiving, by the network device, an Open Shortest Path First (OSPF) Hello packet carrying the device identifier of the other network device adjacent to the network device.

4. A method for determining a packet forwarding path, wherein the method is applied to a centralized system in which controlling and forwarding are separate, and the system comprises a control device and a network device that is managed by the control device, the method comprising:
receiving, by the control device, device information of the network device and interface information of the network device sent by using an Interior Gateway Protocol (IGP) by the network device managed by the control device, wherein the device information of the network device comprises:
a device identifier of the network device,
a device identifier of the control device, and
a role identifier of the network device indicating a forwarding role in the centralized system,
wherein the interface information of the network device comprises:
an interface identifier of the network device,
an interface maximum transmission unit (MTU) of the network device,
an interface type of the network device,
a local circuit identifier of the network device,
a circuit identifier of another network device adjacent to the network device, and
a device identifier of the another network device, wherein the interface type of the network device, the local circuit identifier of the network device, the circuit identifier of the another network device and the device identifier of the another network device jointly identify a pair of neighbor relationships between the network device and the another network device; and
determining, by the control device, a packet forwarding path from the network device to the control device based on the device information and the interface information without needing the network device to compute a packet forwarding path from the network device to the control device.

5. The method according to claim 4, wherein receiving, by the control device, device information of the network device and interface information of the network device that are sent by using an IGP by the network device managed by the control device comprises:
receiving, by the control device, a link state protocol data unit or Link State Packet (LSP) sent by the network device, wherein a Type Length Value (TLV) of the LSP carries the device information and the interface information; or
receiving, by the control device, an opaque link-state advertisement (LSA) sent by the network device, wherein a TLV of the opaque LSA carries the device information and the interface information.

6. A network device, wherein the network device is applied to a centralized system in which controlling and forwarding are separate, and the system comprises a control device and the network device that is managed by the control device, the network device comprising a processor that executes instructions to:
acquire device information of the network device and interface information of the network device, and transmit the device information and the interface information to a sender, wherein the device information of the network device comprises:
a device identifier of the network device,
a device identifier of the control device, and
a role identifier of the network device indicating a forwarding role in the system,
wherein the interface information of the network device comprises:
an interface identifier of the network device,
an interface maximum transmission unit (MTU) of the network device,
an interface type of the network device, a local circuit identifier of the network device,
a circuit identifier of another network device adjacent to the network device, and
a device identifier of the another network device, wherein the interface type of the network device, the local circuit identifier of the network device, the circuit identifier of the another network device and the device identifier of the another network device jointly identify a pair of neighbor relationships between the network device and the another network device; and
send the device information and the interface information to the control device using an Interior Gateway Protocol IGP, while not computing a packet forwarding path from the network device to the control device, so that the control device determines a packet forwarding path from the network device to the control device based on the device information and the interface information.

7. The network device according to claim 6, wherein the processor executes instructions to:
send a link state protocol data unit or Link State Packet (LSP) to the control device, wherein a Type Length Value (TLV) of the LSP carries the device information and the interface information; or
send an opaque link-state advertisement LSA to the control device, wherein a TLV of the opaque LSA carries the device information and the interface information.

8. The network device according to claim 6, wherein the processor executes instructions to:
  receive an Intermediate System to Intermediate System (ISIS) Hello packet, wherein the ISIS Hello packet carries the device identifier of the other network device adjacent to the network device; or
  receive an Open Shortest Path First (OSPF) Hello packet, wherein the OSPF Hello packet carries the device identifier of the other network device adjacent to the network device.

9. A control device, wherein the control device is applied to a centralized system in which controlling and forwarding are separate, and the system comprises the control device and a network device that is managed by the control device, the control device comprising a processor that executes instructions to:
  receive device information of the network device and interface information of the network device that are sent by using an Interior Gateway Protocol (IGP) by the network device managed by the control device, and transmit the device information and the interface information to a processor, wherein the device information of the network device comprises:
    a device identifier of the network device,
    a device identifier of the control device, and
    a role identifier of the network device indicating a forwarding role in the centralized system,
  wherein the interface information of the network device comprises:
    an interface identifier of the network device,
    an interface maximum transmission unit (MTU) of the network device,
    an interface type of the network device,
    a local circuit identifier of the network device, a circuit identifier of another network device adjacent to the network device, and
    a device identifier of the another network device, wherein the interface type of the network device, the local circuit identifier of the network device, the circuit identifier of the another network device and the device identifier of the another network device jointly identify a pair of neighbor relationships between the network device and the another network device; and
  determine a packet forwarding path from the network device to the control device based on the device information and the interface information, without needing the network device compute a packet forwarding path from the network device to the control device.

10. The control device according to claim 9, wherein the processor executes instructions to:
  receive a link state protocol data unit or Link State Packet (LSP) sent by the network device, wherein the LSP carries the device information and the interface information; or
  receive an opaque link-state advertisement (LSA) sent by the network device, wherein the opaque LSA carries the device information and the interface information.

* * * * *